United States Patent
Sirch et al.

(10) Patent No.: US 10,493,537 B2
(45) Date of Patent: Dec. 3, 2019

(54) KEYHOLE SAW

(71) Applicant: HILTI AKTIENGESELLSCHAFT, Schaan (LI)

(72) Inventors: Maximilian Sirch, Honsolgen (DE); Helmut Happach, Untermeitingen (DE); Herbert Muenzenberger, Wiesbaden (DE)

(73) Assignee: Hilti Aktiengesellschaft, Schaan (LI)

( * ) Notice: Subject to any disclaimer, the term of this patent is extended or adjusted under 35 U.S.C. 154(b) by 0 days.

(21) Appl. No.: 15/761,829

(22) PCT Filed: Sep. 27, 2016

(86) PCT No.: PCT/EP2016/072905
§ 371 (c)(1),
(2) Date: Mar. 21, 2018

(87) PCT Pub. No.: WO2017/055240
PCT Pub. Date: Apr. 6, 2017

(65) Prior Publication Data
US 2018/0257153 A1    Sep. 13, 2018

(30) Foreign Application Priority Data
Sep. 28, 2015  (EP) .................................. 15187050

(51) Int. Cl.
*B23B 51/04*  (2006.01)
*B23B 45/06*  (2006.01)
(Continued)

(52) U.S. Cl.
CPC .......... *B23B 51/0426* (2013.01); *B23B 45/06* (2013.01); *B23B 49/026* (2013.01);
(Continued)

(58) Field of Classification Search
CPC ... B23B 51/0426; B23B 45/06; B23B 49/026; B28D 1/041
See application file for complete search history.

(56) References Cited

U.S. PATENT DOCUMENTS 2,787,324 A    4/1957  Hartmeister et al.
3,381,376 A    5/1968  Ames
(Continued)

FOREIGN PATENT DOCUMENTS

CA    2767756 A1 *  8/2012  ............. H02G 3/088
DE    883 876 C      7/1953
(Continued)

OTHER PUBLICATIONS

International Search Report mailed in PCT/EP2016/072905 dated Nov. 25, 2016, with English translation.
(Continued)

*Primary Examiner* — Eric A. Gates
*Assistant Examiner* — Paul M Janeski
(74) *Attorney, Agent, or Firm* — Grüneberg and Myers PLLC

(57) ABSTRACT

A tool for creating a wall opening. The tool includes a hole saw; and a centering jig having a center axis, where the centering jig is constructed as a centering ring, into which the hole saw can be pushed at least partly, and in that both the hole saw and the centering ring have on their circumference an opening such that this can be pushed transverse to the center axis completely onto a line.

10 Claims, 3 Drawing Sheets

(51) Int. Cl.
*B23B 49/02* (2006.01)
*B28D 1/04* (2006.01)

(52) U.S. Cl.
CPC ....... *B28D 1/041* (2013.01); *Y10T 408/56245* (2015.01); *Y10T 408/895* (2015.01)

(56) References Cited

U.S. PATENT DOCUMENTS

| | | | | |
|---|---|---|---|---|
| 4,422,812 | A | * | 12/1983 | Linville .............. B23B 51/0433 408/204 |
| 8,082,701 | B1 | * | 12/2011 | Wendel ................... E04C 3/145 52/100 |
| 2008/0014035 | A1 | * | 1/2008 | Perkovich ............. B23B 47/281 408/1 R |
| 2016/0345619 | A1 | * | 12/2016 | Zaldivar ................... A23L 2/04 |

FOREIGN PATENT DOCUMENTS

| | | |
|---|---|---|
| DE | 35 13 496 A1 | 11/1986 |
| DE | 35 32 157 A1 | 3/1987 |
| DE | 296 00 263 | 8/1996 |
| DE | 103 05 696 | 8/2004 |
| JP | 2000326125 A * | 11/2000 |
| NL | 2006103 C | 8/2012 |

OTHER PUBLICATIONS

Written Opinion of the International Searching Authority mailed in PCT/EP2016/072905 dated Nov. 25, 2016.

* cited by examiner

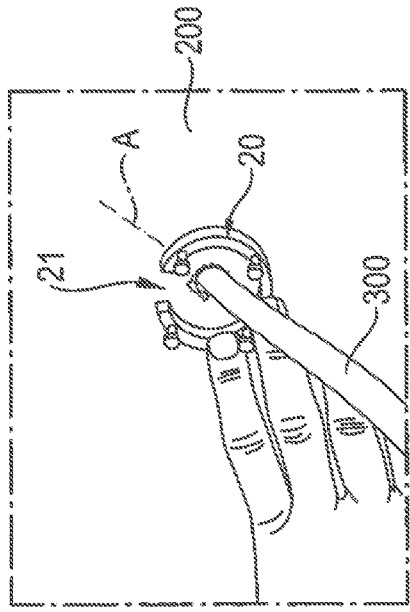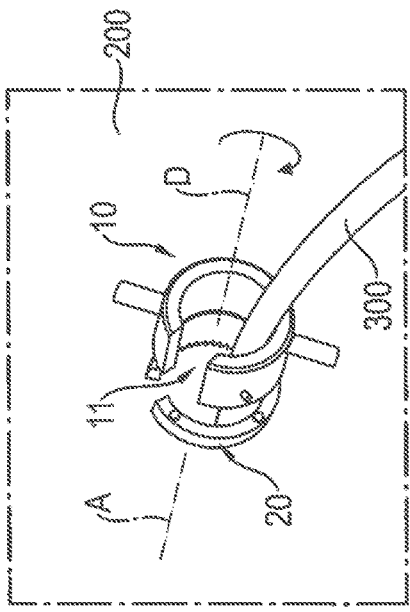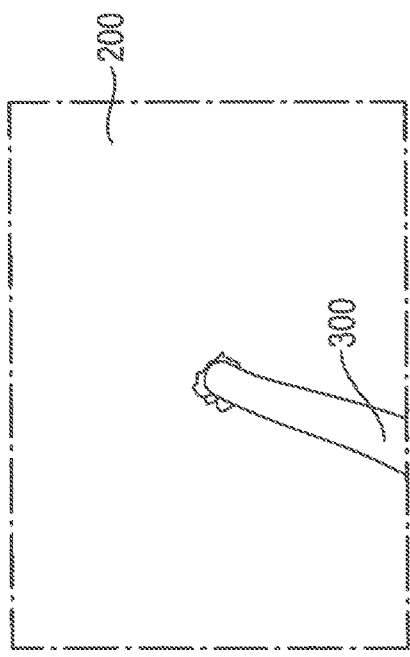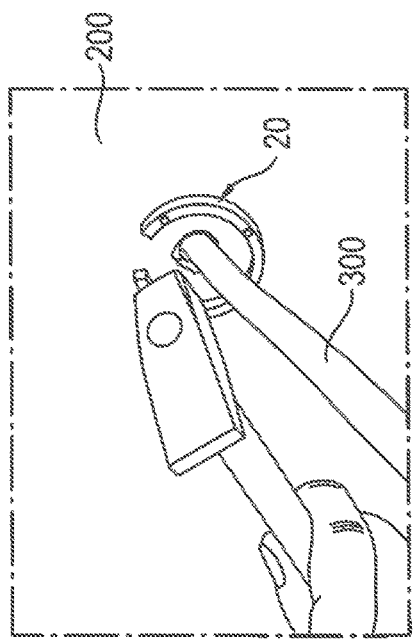

KEYHOLE SAW

This application is a National Stage entry under § 371 of International Application No. PCT/EP2016/072905, filed on Sep. 27, 2016, and which claims the benefit of European Patent Application No. 15187050.8, filed on Sep. 28, 2015.

The present invention relates to a tool for creating a wall opening, with a hole saw and a centering jig having a center axis. Such hole saws are basically known from the prior art and are used to create openings in drywalls, for example of gypsum boards. The centering jig is typically constructed as a centering cutter extending coaxially with the center axis. The openings created by means of the hole saw are used to route lines or to install hollow wall boxes.

Unexamined Application DE 103 05 696 A1 discloses such a hole saw with a centering jig. Another hole saw for boring of circular cutouts for hollow wall boxes is known from Utility Model Specification DE 296 00 263 U1. Further tools for creating an opening in wallboard are known from U.S. Pat. Nos. 3,381,376 and 2,787,324.

It is an object of the present invention to provide a tool, which can be used in diverse ways, for creating a wall opening. It is likewise an object of the invention to specify a method for creating a wall opening.

As regards the tool, the object is achieved by a tool of the type mentioned in the introduction, in which the centering jig is constructed as a centering ring, into which the hole saw can be pushed at least partly. Both the hole saw and the centering ring have on their circumference an opening such that this can be pushed transverse to the center axis completely onto a line. Preferably the line is a line already projecting from a wall.

The invention includes the knowledge that threading of lines, cables, pipes or the like out of drywalls as well as routing of lines, cables, pipes or the like through drywalls is becoming increasingly important and, depending on application, must satisfy both fire-protection requirements and requirements applicable to sound insulation, imperviousness to smoke gas and exclusion of draft air.

In the area of fire protection, it has proved useful for years to introduce prefabricated fire-protection grommets first into a drywall and then to push lines through these fire-protection grommets. However, for its installation in the drywall, a prefabricated fire-protection grommet requires an existing opening matched to the respective grommet. Heretofore, such a matching wall opening cannot be created for an already installed line using the hole saws of prior art tools. To the contrary, an annular gap must be created around a line already installed in the drywall using a sealing compound, which is not available in preshaped form but is installed as a pasty compound.

With the inventive tool, it is now possible for the very first time to create a wall opening matched to a respective fire-protection grommet even for a line already installed in the drywall.

Thus the inventive tool can also be used in diverse ways, namely both for lines already installed in the drywall and for lines yet to be installed in the drywall.

With regard to the method, the object is achieved by a method for creating a wall opening around a line already projecting from a wall by means of a tool as described in the foregoing, with the steps of: pushing the centering ring onto the line, then fixing the centering ring relative to the wall, then inserting the hole saw into the centering ring, and then rotating the hole saw around the center axis to create the wall opening.

Preferably the method provides subsequent insertion of a fire-protection grommet into the wall opening.

Further advantages will become apparent from the following description of the figures. Various exemplary embodiments of the present invention are illustrated in the figures. The figures, the description and the claims contain numerous features in combination. The person skilled in the art will also consider the features expediently, both individually and as practical further combinations.

As used within the scope of the present invention, the singular forms "one", "a" and "an" also include the corresponding plural forms, unless something different can be inferred unambiguously from the relationship. Thus, for example, the term "one" is intended to mean "one or more" or "at least one", unless otherwise indicated.

The terms "exhibit", "with" and "have" are intended to be inclusive and mean that elements other than those cited may also be meant.

Like and similar components are denoted by like reference numerals in the figures, wherein:

FIG. 2 shows a line already projecting from a wall;

FIG. 3 shows a centering ring pushed onto the line;

FIG. 4 shows a centering ring fixed on the wall;

FIG. 5 shows a centering ring with hole saw pushed into it;

EXEMPLARY EMBODIMENT

Figure 1:
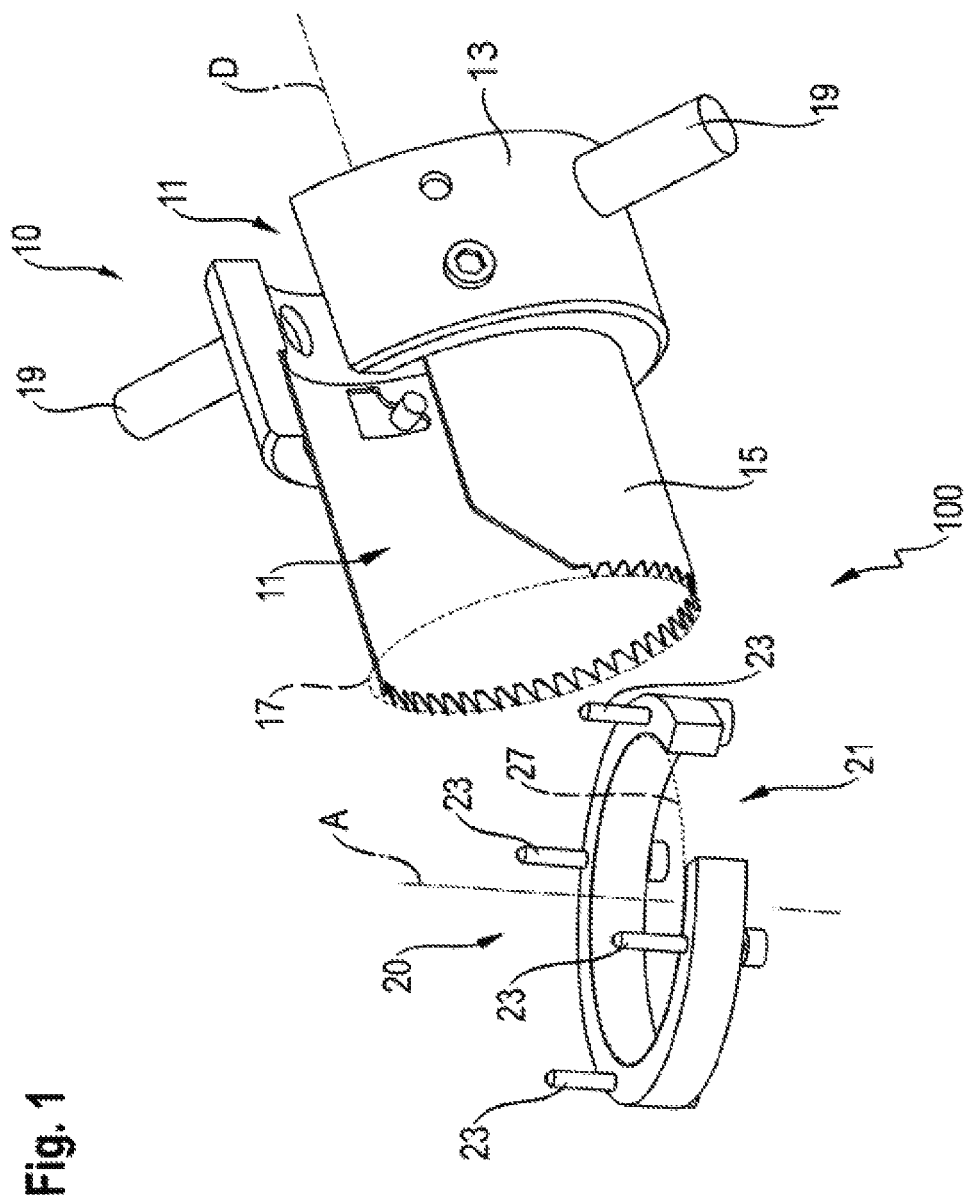
FIG. 1 shows a preferred exemplary embodiment of an inventive tool.

A preferred exemplary embodiment of an inventive tool 100 is shown in FIG. 1. Tool 100 has a hole saw 10 and a centering jig constructed as a centering ring 20. Hole saw 10 is illustrated on the right side of FIG. 1 and centering ring 20 on the left side of FIG. 1.

The centering jig constructed as centering ring 20 has a center axis A, which is represented here by a dash-dot line. Center axis A extends centrally through a full circle defined by entering ring 20.

Centering ring 20 has an opening 21 on its circumference. This opening 21 is formed in such a way that centering ring 20 can be pushed onto a line (compare with FIG. 3). This opening 21 extends over less than one quarter of the circumferential length of centering ring 20. Centering ring 20 has an inner circumference 27, which is indicated by a dotted line.

Hole saw 10 on the right side of FIG. 1 has a base carrier 13 and a saw blade 15 attached thereto. In the exemplary embodiment illustrated here, exactly one saw blade 15 is provided. An outer circumference 17 of the saw blade 15, indicated by a dotted line, is smaller than the inner circumference 27 of centering ring 20. This outer circumference 17 of saw blade 15 and inner circumference 27 of centering ring 20 are paired with loose fit, so that saw blade 15 can be introduced easily into centering ring 20 and at the same time guided precisely therein.

As may likewise be inferred from FIG. 1, hole saw 10 has on its circumference an opening 11, which here extends completely through base carrier 13 and saw blade 15, so that hole saw 10 can be pushed transverse to its axis of rotation D onto the line (compare with FIG. 5). Axis of rotation D of hole saw 10 extends coaxially with center axis A when hole saw 10 is pushed into centering ring 20.

As may likewise be inferred from FIG. 1, opening 21 on the circumference of hole saw 10, which here is formed both on saw blade 15 and on base carrier 13, extends over less than one quarter of the circumferential length of hole saw 10.

Centering ring 20 has dowels 23 for fixing centering ring 20 on a wall (compare with FIG. 4). In the exemplary embodiment illustrated here, dowels 23 are constructed in the form of nails and project parallel to center axis A of centering ring 20.

For actuation of hole saw 10 by hand, it has hand-controlled actuating means 19, which here are provided in the form of two handle pieces, which project from base carrier 13 transverse to axis of rotation D.

Hereinafter, with reference to FIGS. 2 to 7, a method for creating a wall opening around a line already projecting from a wall will be described. For this purpose, FIG. 2 shows a line 300 projecting from a wall 200, here a gypsum-board wall.

In a first step, in FIG. 3, centering ring 20 is first pushed onto line 300. Since centering ring 20 has on its circumference an opening 21, centering ring 20 can be pushed transverse to center axis A completely onto line 300. In other words, an imaginary line cross section is disposed completely in an inner volume of centering ring 20.

FIG. 4 shows how centering ring 20 can be fixed relative to wall 200 by using a hammer to drive in the dowels, not shown here.

In a subsequent step, hole saw 10 is inserted into centering ring 20. The result is shown in FIG. 5. Opening 11 on the circumference of hole saw 10, which permits hole saw 10 to be pushed transverse to center axis Z of the centering ring 20 and transverse to axis of rotation D of hole saw 10 onto line 300, is apparent in FIG. 5 in particular.

Figure 6:
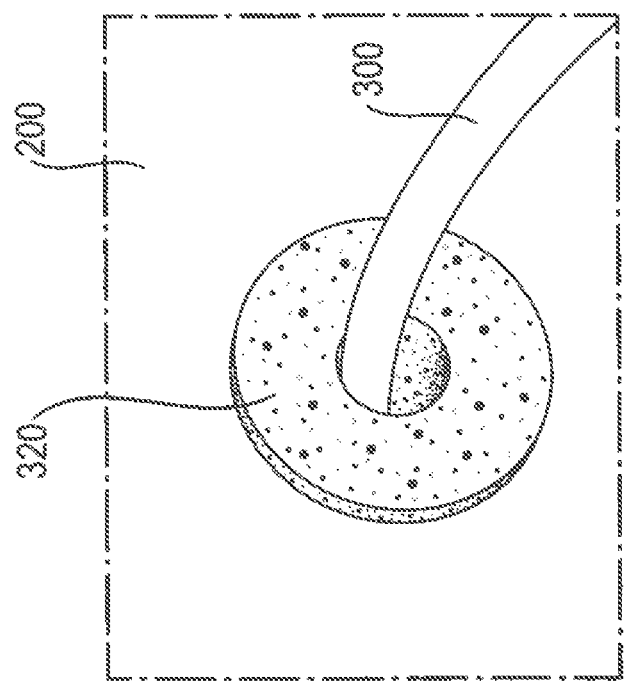
FIG. 6 shows a wall opening created around the projecting line.
Figure 7:
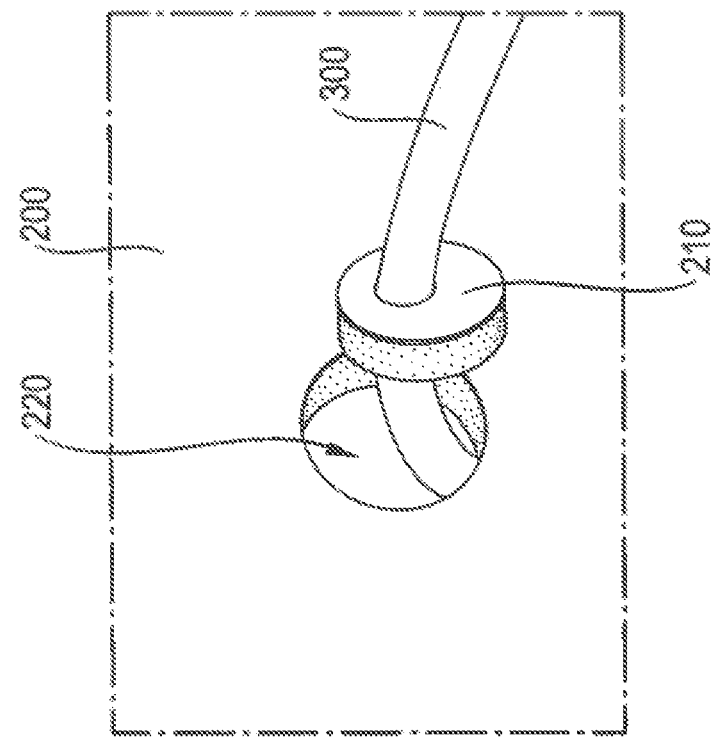
FIG. 7 shows a fire-protection grommet inserted into the wall opening.

Thereafter hole saw 10 is rotated in the direction of the arrow around its axis of rotation D, and in this way wall opening 220 shown in FIG. 6 is obtained. A knockout 210 remains at first around line 300 and can easily be removed later. Thereafter, as shown in FIG. 7, a prefabricated fire-protection grommet 230 is inserted into wall opening 220.

LIST OF REFERENCE SYMBOLS

10 Hole saw
11 Opening on the hole saw
13 Base carrier
15 Saw blade
17 Outer circumference
20 Centering ring
21 Opening on the centering ring
23 Dowel
27 Inner circumference
100 Tool
200 Wall
220 Wall opening
300 Line
320 Fire-protection grommet
A Center axis

The invention claimed is:

1. A tool for creating a wall opening, the tool comprising:
a hole saw; and
a centering jig having a center axis,
wherein the centering jig comprises a centering ring to receive the hole saw, and
wherein, when assembled for cutting, the hole saw has a circumferential cutting surface comprising a first opening and the centering ring has a circumferential surface comprising a second opening, the first and second openings to allow the hole saw and the centering ring to be pushed in a direction transverse to the center axis around a line.

2. The tool according to claim 1, further comprising:
a base carrier and a saw blade,
wherein the base carrier and the saw blade are attached to one another, and
wherein an outer circumference of the saw blade is smaller than an inner circumference of the centering ring.

3. The tool according to claim 2, wherein the saw blade is free to move within the centering ring as a result of the outer circumference of the saw blade being smaller than the inner circumference of the centering ring.

4. The tool according to claim 1, wherein the centering ring has at least one dowel to fix the centering ring on a wall through which the line passes.

5. The tool according to claim 1, wherein
the centering ring has a first axis, and
the hole saw has a second axis which is parallel to the first axis when the hole saw is in the centering ring.

6. The tool according to claim 1, wherein at least one of the first opening and the second opening is less than one quarter of the circumference of a corresponding one of the hole saw and centering ring.

7. The tool according to claim 1, wherein the hole saw has exactly one saw blade.

8. The tool according to claim 1, further comprising a hand-controlled actuator coupled to the hole saw and to move the hole saw when a force is applied.

9. A method for creating a wall opening around a line already projecting from a wall, the method comprising:
attaching the centering ring of the tool according to claim 1 to a wall,
pushing the centering ring around the line through the second opening,
fixing the centering ring relative to the wall,
inserting the hole saw into the centering ring and around the line, and
rotating the hole saw around the center axis within the centering ring.

10. The method according to claim 9, further comprising:
inserting of a fire-protection grommet into the wall opening.

* * * * *